United States Patent
Rathnam et al.

(10) Patent No.: US 12,166,383 B2
(45) Date of Patent: Dec. 10, 2024

(54) MAGNET FIXATION BY TRANSFER RESIN MOLDING IN A SKEWED ROTOR STACK SEGMENT APPLICATION

(71) Applicant: FORD GLOBAL TECHNOLOGIES, LLC, Dearborn, MI (US)

(72) Inventors: Singar Rathnam, Taylor, MI (US); Devan James Anderson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 17/460,936

(22) Filed: Aug. 30, 2021

(65) Prior Publication Data
US 2023/0063780 A1  Mar. 2, 2023

(51) Int. Cl.
*H02K 1/27* (2022.01)
*H02K 5/08* (2006.01)
*H02K 15/03* (2006.01)
*H02K 15/14* (2006.01)

(52) U.S. Cl.
CPC ............ *H02K 1/27* (2013.01); *H02K 5/08* (2013.01); *H02K 15/03* (2013.01); *H02K 15/14* (2013.01)

(58) Field of Classification Search
CPC ............ H02K 1/27; H02K 5/08; H02K 15/03; H02K 15/14; H02K 15/12; H02K 2201/06; H02K 1/2766
USPC ....................................... 310/156.23, 156.47
See application file for complete search history.

(56) References Cited

U.S. PATENT DOCUMENTS

| | | | |
|---|---|---|---|
| 6,225,724 B1 | 5/2001 | Toide et al. | |
| 6,867,524 B2 | 3/2005 | Liang | |
| 7,928,622 B2 | 4/2011 | Okubo | |
| 8,728,375 B2 | 5/2014 | Matsubayashi et al. | |
| 9,178,394 B2 | 11/2015 | Asahi et al. | |
| 10,283,264 B2 | 5/2019 | Nagai et al. | |
| 2004/0245880 A1* | 12/2004 | Liang | H02K 1/278 310/156.47 |
| 2014/0117791 A1* | 5/2014 | Fiseni | H02K 29/12 29/598 |
| 2017/0040853 A1* | 2/2017 | Totaro | H02K 1/278 |
| 2020/0014264 A1* | 1/2020 | Bourqui | H02K 1/246 |
| 2020/0395827 A1* | 12/2020 | Zulaika | H02K 1/276 |

OTHER PUBLICATIONS

JP 2007282392 A (Year: 2007).*
JP 2013110930 A (Year: 2013).*

* cited by examiner

*Primary Examiner* — Daniel C Puentes
*Assistant Examiner* — Minki Chang
(74) *Attorney, Agent, or Firm* — David B Kelley; Brooks Kushman P.C.

(57) ABSTRACT

A skewed rotor core assembly having a resin mold disposed in a plurality of longitudinal channels and a resin flow path is provided. The rotor core has a first and second magnet stack each defining a plurality of longitudinal channels. The plurality of longitudinal channels for the first stack are misaligned with the plurality of longitudinal channels for the second stack. Methods of making the same are also provided.

8 Claims, 4 Drawing Sheets

MAGNET FIXATION BY TRANSFER RESIN MOLDING IN A SKEWED ROTOR STACK SEGMENT APPLICATION

TECHNICAL FIELD

The present disclosure relates to resin transfer molding of skewed rotor cores.

BACKGROUND

Transfer molding resin has been used for producing non-skewed rotor cores. However, due to restrictions in the resin flow path associated with the overlap of the skewed design, resin transfer molding has not been adopted for skewed rotor cores. Yet, skewed rotor cores may offer better harmonics, prevent cogging, and have greater torque capacities.

SUMMARY

A skewed rotor core assembly is provided. The skewed rotor core assembly includes a longitudinal rod defining a longitudinal axis, a first magnet stack, a second magnet stack and a hardened resin mold surrounding the first and second magnet stacks. The first magnet stack has a plurality of magnets arranged annularly around the longitudinal rod and defines a first plurality of longitudinal channels between each magnet. The second magnet stack also has a plurality of magnets arranged annularly around the longitudinal rod and defines a second plurality of channels. The first and second plurality of channels are misaligned with one another. The first and second magnet stacks are configured to define a resin flow path between the first plurality of magnets and the second plurality of magnets. The hardened resin mold is disposed in the first and second plurality of channels and the resin flow path.

A rotor core assembly is provided. The rotor core assembly includes a plurality of magnetic stacks and a resin mold fixing the plurality of magnetic stacks. Each magnetic stack defines longitudinal channels such that the channels of adjacent magnetic stacks are misaligned by an overlap distance and adjacent magnetic stacks define a transverse resin flow path therebetween. The resin mold is disposed in the longitudinal channels and resin flow path.

A method of making a skewed rotor core assembly is provided. The method includes providing a first and second magnet stack each having a plurality of longitudinal channels, pressing the stacks together such that a longitudinal channels of the first magnet stack and the longitudinal channels of the second magnet stack are misaligned, injecting a flowable resin into the plurality of longitudinal channels and the resin flow path, and hardening the flowable resin disposed in the plurality of channels and the resin flow path forming a resin mold that fixes the position of the magnet stacks. The first and second magnet stacks defining a resin flow path between the first and second plurality of magnets.

DETAILED DESCRIPTION

Figure 1:
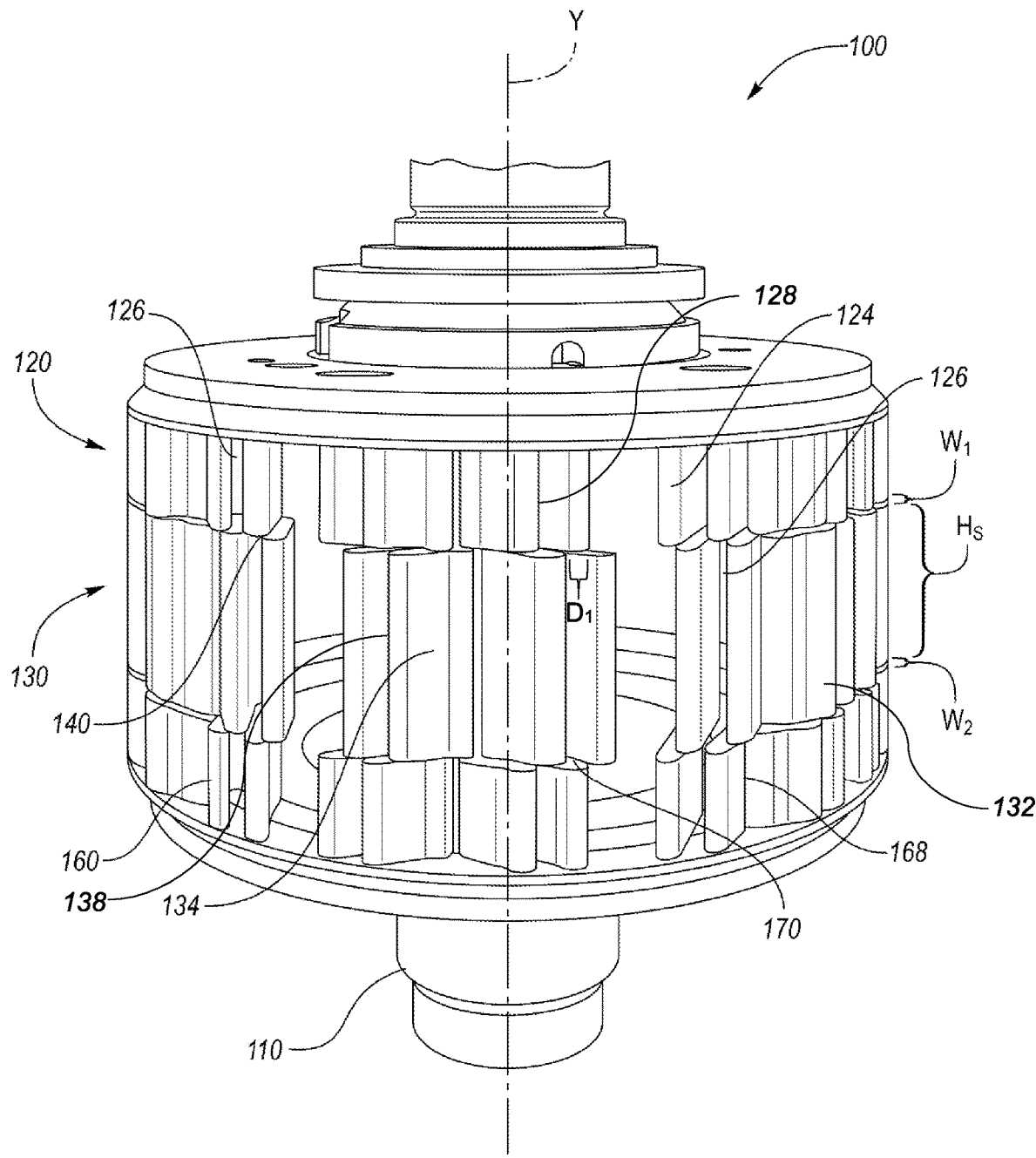
FIG. 1 is a skewed rotor core assembly including an artificial resin flow path.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, percent, "parts of," and ratio values are by weight; the term "polymer" includes "oligomer," "copolymer," "terpolymer," and the like; the description of a group or class of materials as suitable or preferred for given purpose implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Figure 2:
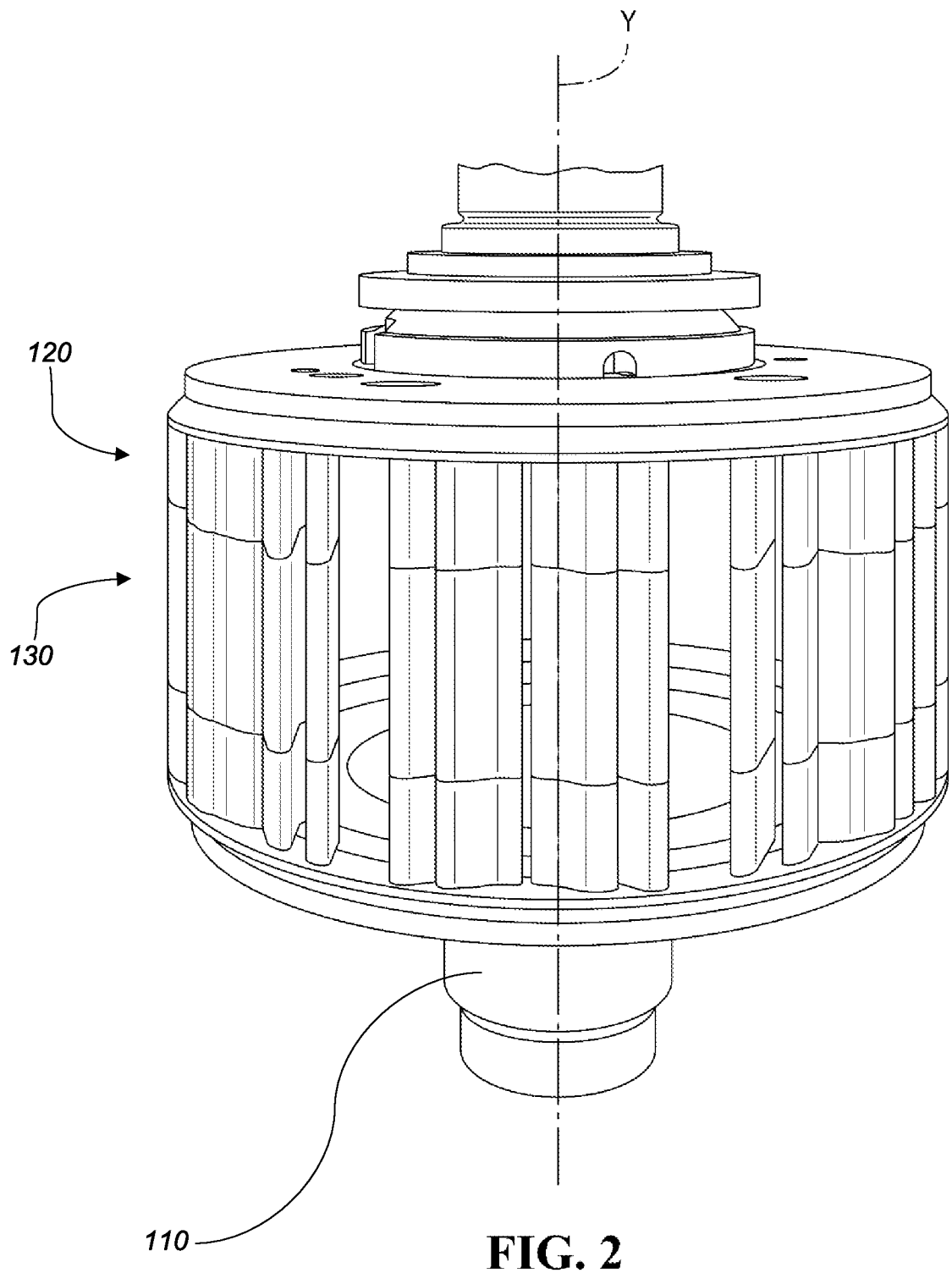
FIG. 2 is a non-skewed or conventional rotor core assembly.
Figure 3:
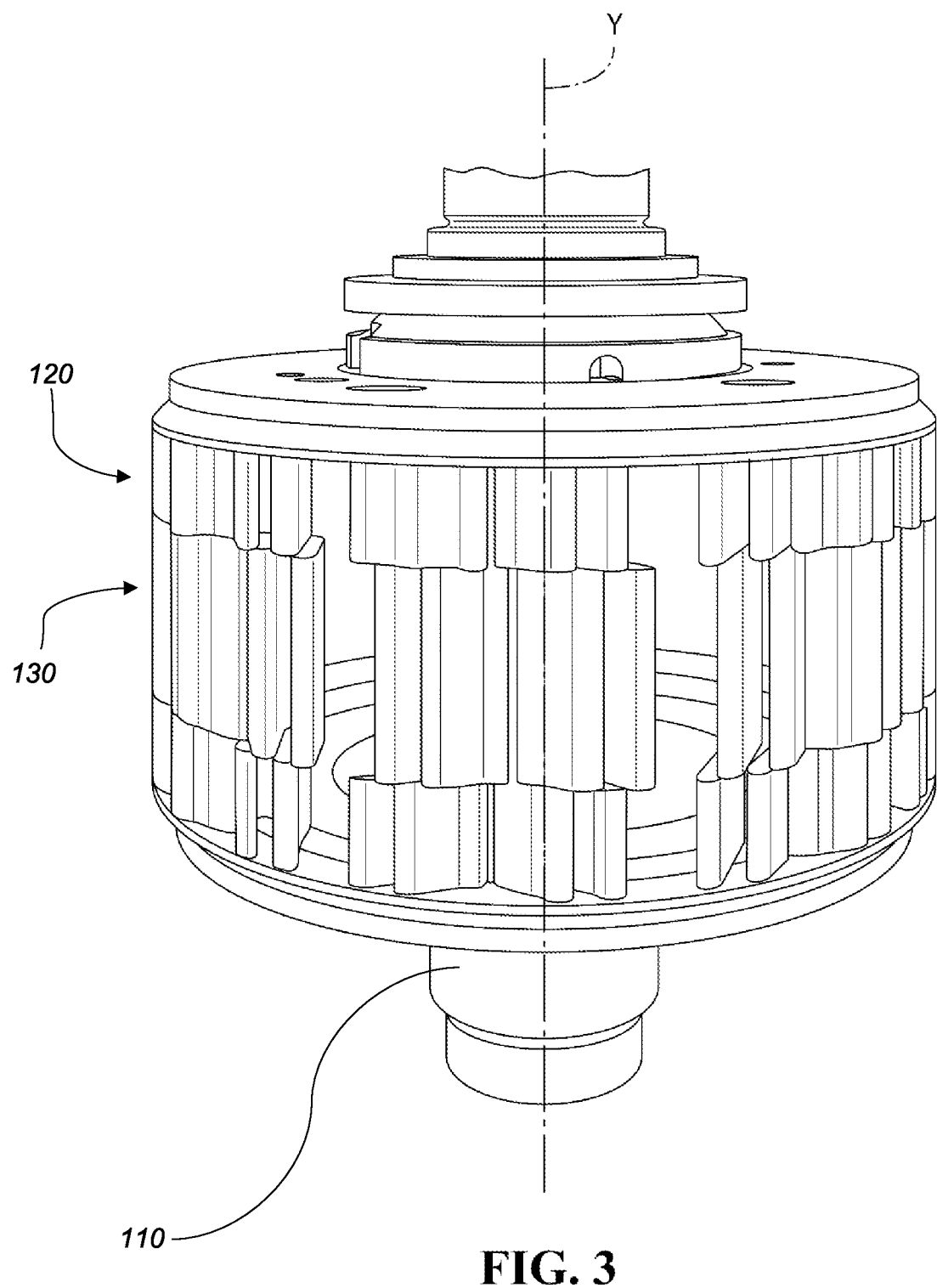
FIG. 3 is a skewed rotor core assembly without an artificial resin flow path.
Figure 4:
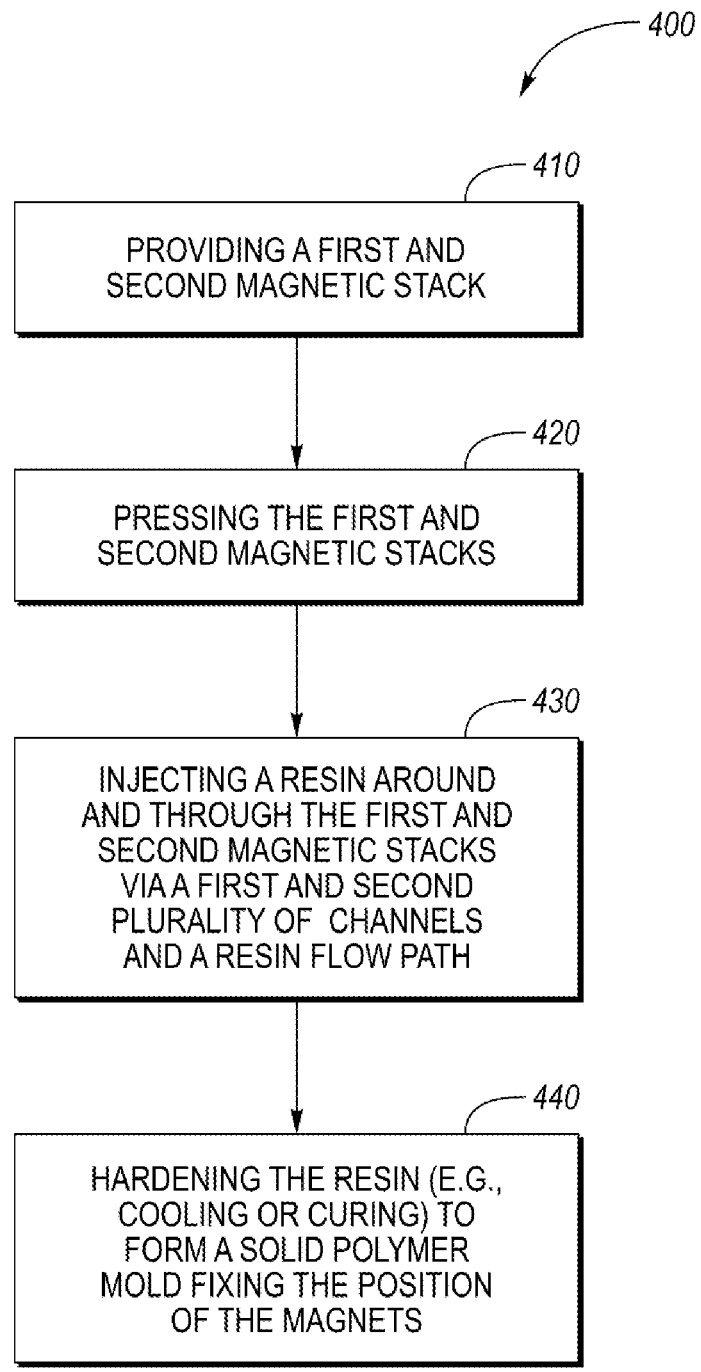
FIG. 4 is a flowchart depicting a method of making a skewed rotor core assembly.

A resin transfer molded rotor core assembly that is skewed is provided. In FIG. 1, rotor core 100 includes a longitudinal rod 110 defining a longitudinal axis Y and a first and second magnet stack 120, 130 positioned adjacent to one another and around the longitudinal rod 110. The first magnet stack 120 comprising a first plurality of magnets arranged annularly around the rod 110. Between each magnet 124 of the first plurality of magnets is a longitudinal channel 126. Thus, the first plurality of magnets forms a plurality of longitudinal channels 128. The second magnet stack 130, likewise comprises a second plurality of magnets 132 forming a second plurality of longitudinal channels 138. As shown in FIG. 1, the first plurality of longitudinal channels 128 are misaligned or skewed from the second plurality of longitudinal channels 138. The misalignment or skew may be defined by an overlap distance $D_1$. In one variation, $D_1$ may be 0.1 to 10 mm, or more preferably 1 to 7 mm, or even more preferably 2 to 4 mm. In a refinement, the overlap distance may be defined by rotational distance or displacement of the first or second plurality of channels. For example, the overlap may be 0.1 to 20 degrees, or more preferably 1 to 6 degrees, or even more preferably 1.5 to 4 degrees. Greater overlap distances may be needed for flatter assemblies. Merely for understanding FIG. 2 demonstrates a non-skewed design where the first and second plurality of magnets are aligned. As can be seen in FIG. 2, the first and second plurality of channels align to create a continuous path for resin to flow from top to bottom or vice versa without any restrictions. However, in conventional skewed designs, as shown in FIG. 3, the flow of a resin material through the first plurality of channels is inhibited or restricted by the plurality of magnets of the second magnet stack. This limitation is overcome by incorporating a first artificial resin flow path 140 having a width $W_1$ between the magnet stacks 120, 130. In a variation, the width $W_1$ may be 0.1 to 1.5 mm, or more preferably 0.2 to 0.9 mm, or even more preferably 0.4 to 0.7 mm.

The width $W_1$ or size of the resin flow path 140 depends on many factors such as the viscosity of the resin, the injection rate/pressure, the time the resin is permitted to flow before hardening, and the amount of overlap. In a refinement, the rotor assembly 100 has a ratio for the width $W_1$ of the resin flow path 140 to the overlap distance $D_1$ of 0.1:1 to 10:1, or more preferably 0.5:1 to 5:1, or even more preferably 1:1 to 2:1. In another refinement, the width $W_1$ may be characterized as 0.1 to 15% of the stack height $H_s$, or more preferably 1 to 10% or even preferably 2 to 5%. In one variation, the artificial resin flow path 140 may be incorporated by providing magnets 134 having a height $H_m$ that are shorter than the height $H_s$ of the magnet stack 130. The magnet stack may include a frame or housing for holding the plurality of magnets. The frame or housing may have a height greater than $H_m$ thus defining a resin flow path when pressed against an adjacent magnet stack.

In a refinement, the magnets of the first stack and the second stack may have a cross-sectional area overlap of at least 5%, more preferably 10% or, even more preferably 20% and a cross-sectional area overlap of not more than 40%, more preferably not more than 25%, and even more preferably not or than 15%.

A hardened resin may be disposed in the channels 128, 138 and resin flow path 140 forming a resin mold. The hardened resin may be thermoplastic or thermoset such that it maybe hardened by cooling or curing. For example, the hardened resin may be a low viscosity thermoset polymer. In a refinement, the viscosity may be no more than 100 cps, or more preferably no more than 10 cps, or even more preferably no more than 1 cps as per ASTM D4287. The resin may have a spiral flow of less than 30 minutes, more preferably less than 10 minutes or even more preferably less than 5 minutes as measured by ASTM D3123-09. In another variation, an EMMI spiral mold may be used at 300° F. with a 12 to 15 gram charge and a 600, 900, 1800 or 2700 lbs/in$^2$ corresponding to the desired application. The spiral flow using the EMMI mold may be less than 2 hours, more preferably less than 1 hour, and even more preferably less than 30 minutes. A thermoset resin may be crosslinked upon initiation such as but not limited to introducing a crosslinker, reaching a thermal threshold, or UV exposure. A thermoset resin may be less sensitive to temperature.

The rotor core assembly is not particularly limited to a specific number of magnet or magnetic stacks but for the skewed design. In at least one variation, at least two adjacent stacks are misaligned. In another variation, the longitudinal channels of any stack should be misaligned or skewed from the channels of any adjacent stack. For example, as shown in FIG. 1, the rotor core assembly 100 may have a third magnet stack 160 adjacent to the second magnet stack 130. The third magnet stack 160 likewise includes a third plurality of magnets 162 arranged around the longitudinal rod 110 which define a third plurality of longitudinal channels 168. The third plurality of longitudinal channels 168 are misaligned or skewed from the adjacent second plurality of longitudinal channels 138. Likewise, the second magnet stack 130 and third magnet stack 160 define a second resin flow path 170 therebetween having a width $W_2$. The width $W_2$ may be the same as the width $W_1$ or the widths may be different. For example, the resin flow paths closer to an end or each end may have a greater width to facilitate early flow of the resin to the subsequent stacks or center stacks.

A method for making a rotor assembly is also provided. Method 400 includes providing at least a first and second magnetic stack respectively including a first and second plurality of magnets (i.e., step 410). The first and second plurality of magnets respectively defining a first and second plurality of longitudinal channels between the magnets. The second plurality of magnets being shorter than the second magnetic stack. The method also includes pressing the first and second magnetic stacks together such that the second plurality of longitudinal channels is misaligned from the first plurality of longitudinal channels (i.e., step 420). The magnetic stacks being configured such that pressing the first and second magnetic stack together define a resin flow path between the first plurality of magnets and the second plurality of magnets. A flowable resin may be injected through the first and/or second plurality of channels to and through the resin flow path (i.e., step 430). The flowable resin and/or press may be heated (prior to or during injection) to improve the flowability of the resin or to make it liquid. For example, resin may be pre-heat at 50 to 300° C., or more preferably 100 to 250° C., or even more preferably 150 to 190° C. The resin may be heated to obtain a predetermined viscosity. A lower viscosity resin may more easily flow through the plurality of channels and resin flow path. For example, the resin may fill the mold, the longitudinal channels and resin flow paths within 1 second to 5 minutes, more preferably 5 to 60 seconds, and even more preferably 10 to 30 seconds. The resin may be injected into a mold surrounding the pressed magnet stacks. The flowable resin may be hardened by cooling and/or curing to form a solid polymer mold that fixes the position of the first and second plurality of magnets (i.e., step 440). The flowable resin may be a thermoplastic or thermoset. For example, a thermoplastic resin may be heated to make if sufficiently flowable and then cooled to induce hardening. A thermoset resin may be heat curable and the mold or pot may be heated such that after 10 second to 5 minutes the resin solidifies, or more preferably 20 to 60 second or even more preferably 25 to 35 seconds. However, thermoplastic molds may be sensitive to temperature so thermoset resins may be used. A thermoset resin may have low viscosity prior to curing and crosslink upon initiation. Initiation may be triggered by mixing a crosslinker with the resin, by achieving a thermal threshold or another energy source such as UV light. In a variation, the first magnetic stack is adjacent to a press injection gate. The flowable resin may be injected into the first plurality of channels through the resin flow path and into the second plurality of channels. The flowable resin may surround each magnet of the plurality of magnets forming a magnet pocket in the polymer mold when hardened.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A rotor core assembly comprising:
   a plurality of magnetic stacks each defining longitudinal channels between magnets of each magnetic stack, wherein the longitudinal channels of one of the magnetic stacks are misaligned from an adjacent one of the magnetic stacks to define an overlap distance that is less than the width of each magnet and wherein each pair of the magnetic stacks defines a resin flow path therebetween, and widths of the resin flow paths are different; and
   a resin mold disposed in the longitudinal channels and corresponding resin flow paths.

2. A method of making a skewed rotor core assembly comprising:
   pressing together first and second magnetic stacks, that respectively include a first and second plurality of magnets and respectively define a first plurality of longitudinal channels between magnets of the first plurality of magnets and define a second plurality of longitudinal channels between magnets of the second plurality of magnets, such that the second plurality of longitudinal channels is misaligned from the first plurality of longitudinal channels by a distance and a resin flow path having a width is defined between the first and second plurality of magnets, the width and distance defining a ratio from 0.5:1 to 5:1;
   injecting a flowable resin having a viscosity of no more than 100 centipoise into the first and second plurality of longitudinal channels and the resin flow path; and
   hardening the flowable resin to a polymer mold that fixes a position of the first and second plurality of magnets, the flowable resin traveling from the first or second plurality of longitudinal channels to the resin flow path and then to the other of the first or second plurality of longitudinal channels.

3. The method of claim 2, wherein the first magnetic stack is adjacent to a press injection gate during the pressing and injecting and the second magnetic stack is not adjacent to the press injection gate.

4. The method of claim 2, wherein the resin flow path has a width of 0.1 to 1.5 mm.

5. The method of claim 4, wherein the width is 0.2 to 0.7 mm.

6. The method of claim 4, wherein the second plurality of longitudinal channels are misaligned from the first plurality of longitudinal channels by 0.1 to 20 degrees.

7. The method of claim 2, wherein the second magnetic stack has a stack height and each magnet of the second magnetic stack has a magnet height less than the stack height.

8. The method of claim 2, wherein the flowable resin has a spiral flow of less than 30 minutes.

* * * * *